Feb. 19, 1946.   F. FRIEDHEIM   2,395,111
CUTTING RAKE FOR CRAB GRASS AND THE LIKE
Filed March 6, 1944
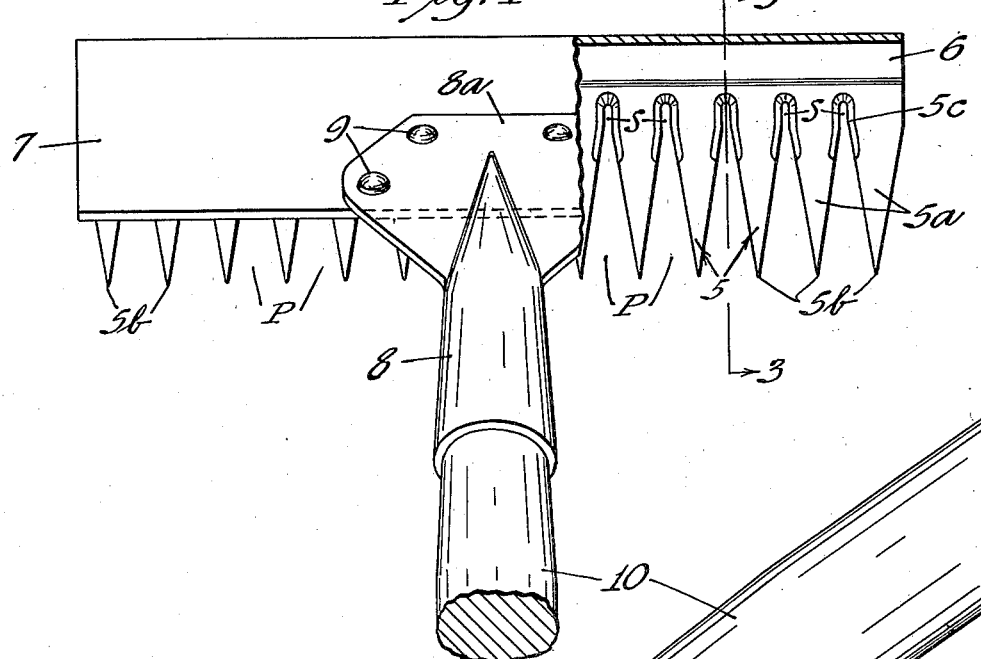
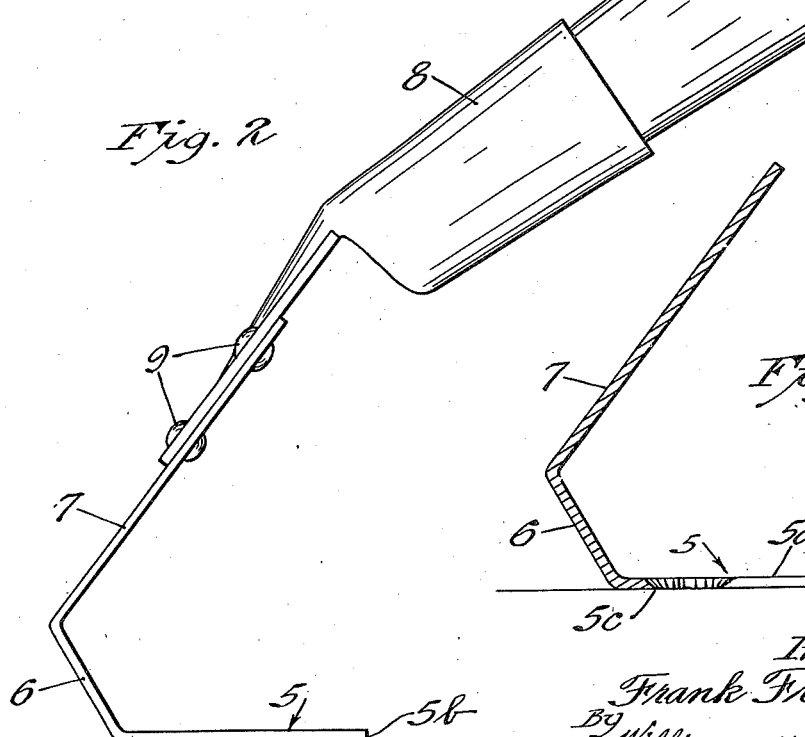
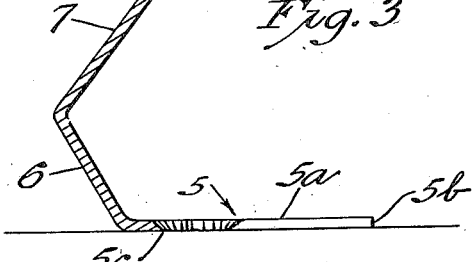
Inventor
Frank Friedheim
By Williamson & Williamson
Attorneys Patented Feb. 19, 1946

2,395,111

UNITED STATES PATENT OFFICE 2,395,111

CUTTING RAKE FOR CRAB GRASS AND THE LIKE

Frank Friedheim, Minneapolis, Minn.

Application March 6, 1944, Serial No. 525,187

2 Claims. (Cl. 56—400.07)

This invention relates to a lawn tool in the general form of a rake, for removing weeds, of the type which develop runners, without stripping or scattering the seeds therefrom and without pulling or disturbing the roots thereof.

Much difficulty has been encountered in the removal from lawns of weeds such as crab grass and other wire grasses of the type forming elongated runners which radiate from central roots and some of which have rootlets at their joints. To eradicate weeds of this type, it is desirable to engage and separate off the runners which carry seeds by sliding the teeth of an implement underneath the same and then if possible remove these runners close to their connection with the main roots without disturbing or stripping off seeds adhering thereto.

Most rakes or other tools for eradicating weeds of this type have been constructed to grasp and pull out the weeds by the roots, thereby disturbing the lawn in the up-rooting process and in the pulling operation usually stripping off a quantity of the seeds which causes the sowing of more weeds.

Most of such weeds, such as crab and Bermuda grasses are annual plants and therefore, if the branches, runners or shoots with the seeds thereon can be cut off and gathered without stripping of the seeds, objectional growth may be eradicated.

It is is an object of my invention, therefore, to provide a weed-cutting rake for eradication of weeds of the class described which will through its structure and operation cause the runners or branches of the weeds to be smoothly guided and engaged adjacent the roots and then cut off without up-rooting the weeds and without stripping of the seeds connected with the runners or branches.

More specifically it is an object to provide a lawn tool of the class described having a series of flat V-shaped teeth which throughout their entire lengths are disposed in a horizontal plane to lie flat against the ground and which form relatively wide converging guides to underlie and engage the runners adjacent the roots and which further are constructed at the apexes formed between the several teeth to form narrow flat cutter elements for cutting off runners or branches from the roots without producing any stripping action on the adhering seeds.

These and other objects and advantages of my invention will be more apparent from the following description made in connection with the accompanying drawing, wherein like reference characters refer to the same parts throughout the several views, and in which:

Figure 1 shows a view partially in plan and partially in section of the head of a lawn tool embodying my invention;

Figure 2 shows a side elevation of the same;

Figure 3 shows a cross section taken on the line 3—3 of Figure 2.

In the embodiment of the invention illustrated in the drawing, the head of my weed cutting tool is constructed generally in the manner of a rake comprising a longitudinally bent plate constructed preferably of relatively heavy gauge sheet metal. The plate is shown as bent along two longitudinal lines to provide a flat ground-engaging toothed portion 5, an intermediate preferably imperforate gathering portion 6 extending at an obtuse angle relatively to the toothed portion and a rearwardly angled relatively wide upper portion 7 extending at an obtuse angle to the intermediate portion 6.

A depending attachment plate 8a of a socket coupling 8 is secured by suitable means, such as rivets 9, to the upper central portion of the head portion 7 and an elongated handle 10 has its forward end rigidly secured in the socket member 8. The angulation of the handle 10 to the flat toothed portion of my tool is such as to enable the head to be slid back and forth with the toothed portion 5 disposed flush against the ground.

The flat toothed portion 5 of the head is cut or otherwise formed to provide a series of rather widely diverging flat teeth 5a, the rearwardly disposed tips 5b thereof being disposed an effective distance apart, for example, approximately ⅝ of an inch, said teeth throughout the greater part of their lengths being defined by diverging straight lines and the several teeth 5a providing converging V-shaped passages P of an effective width to gather and guide the branches or runners of weeds of the type described toward the heels of the teeth.

Adjacent the heels of the several teeth, the teeth are defined by short, straight line portions disposed in close parallel relationship and providing rather narrow cutter slots S which preferably are substantially 1/16 of an inch wide. The teeth 5a are preferably of substantially equal thickness throughout their lengths from tip to heel.

The upper thickness of the toothed portion 5a is beveled to a U-shaped cutting edge 5c surrounding each of the cutter slots S. The several U-shaped bevels form cutter blades defining each of the slots S and said blades extend slightly beyond said slots rearwardly into the converging entrance portions as shown in Figure 1.

It will be noted that the length of the head of my tool is materially less than rakes of various types and contains fewer teeth. It is so constructed and made of substantially rigid heavy gauge material to withstand the effort necessary to produce the shearing action on a multiplicity of tough weeds such as crab grass, Bermuda grass and other wire grasses having elongated branches or runners.

In use the toothed portion 5a of the head is disposed horizontally flush with the ground and the handle is then conveniently angled for reciprocating the head. The teeth, as the head is drawn toward the operator, slip or slide underneath the runners and branches because the relatively wide converging passages smoothly guide these runners inwardly toward the apexes of the V-shaped passages P, without producing any stripping action on the branches. Thus, the stocks and branches of the weeds are guided into the restricted cutter slots S, the movement of the rake head producing a shearing action along the cutting edges 5c just above the main roots of the weeds and thereby cutting off the runners or branches without up-rooting the plants. In the case of wire grasses which form small rootlets at the joints of the branches, these small rootlets are removed in the sliding and guiding action without stripping of seeds adhering to the runners.

Upon the very stroke of the head all material adhering to the cutter slots is detached by frictional engagement of the underside of the flat toothed portions with the ground. In this connection it is important that the cutter slots be formed in the flat toothed portions 5a of the head rather than in the adjacent upwardly curved portion, to produce a more efficient detachment of the material and to further provide a true shearing action of the stalks without tendency of upward wedging or pulling. The tool frees itself readily from the material into which it has been drawn and because of the angled intermediate portion 6 rides easily over the grass and material behind it. The cut branches are progressively moved forwardly and collected after being cut by the reciprocation of the rake head.

My improved lawn tool has demonstrated, in extensive use, a high efficiency for eradicating weeds of the runner or branch producing type including crab, Bermuda, devil and other wire grasses and weeds. The flat, relatively thin teeth with the substantial amount of bearing surface on the toothed portion 5 of the head slides smoothly underneath the runners and guide and collect the same without producing any stripping action thereon with the result that the branches of the weeds are severed without any substantial removal of the seeds therefrom.

In operation of my lawn tool a mowing action is obtained on all types of grass or weeds without disturbing the roots. The upper portions of stalks of grass and weeds, including the heads and stalks of dandelions, are guided by the widely diverging passages P into engagement with the sharpened side edges 5c of the cutter slots. Thus my device is very efficient for removing dandelions, cleaning around shrubbery, edging overlapping grass on side walks, around trees and close to buildings. The stalks of grass and other weeds which grow upwardly from the ground are engaged and cut by the edges of the cutter slots S without disturbing or up-rooting the roots, and thus my device may be used for mowing purposes where it is impossible to utilize a lawn mower or other mowing device.

It will, of course, be understood that various changes may be made in the form, details, arrangements and proportions of the parts without departing from the scope of my invention.

What I claim is:

1. In a cutting rake for eradicating creeping weeds, a head having a flat plate portion adapted to lie substantially flush against the ground, said plate portion being formed to define a plurality of rearwardly extending, flat, substantially V-shaped teeth which define converging, substantially V-shaped guiding passage therebetween, said plate portion being also formed to define narrow, substantially straight cutter slots therein, communicating with the apexes of said guiding passages, the teeth throughout their entire lengths and including the portions defined by the narrow, straight slots being disposed in a common plane to lie flat against the ground.

2. In a cutting rake for eradicating creeping weeds, a head having a series of flat, V-shaped teeth, said teeth forming converging V-shaped guiding passages therebetween and also constructed to form relatively narrow, substantially straight cutter slots communicating with the apexes of said guiding passages, the portions of said teeth defining said cutter slots being beveled at their upper sides to provide sharpened cutting edges adapted to engage and cut the runners of creeping weeds above the roots thereof, said teeth throughout their entire lengths and including the portions defined by the narrow, straight, sharpened slots being disposed in a common plane to lie flat against the ground.

FRANK FRIEDHEIM.